United States Patent
Musha et al.

(10) Patent No.: US 8,840,116 B2
(45) Date of Patent: Sep. 23, 2014

(54) SEAL MECHANISM AND TREATMENT APPARATUS

(75) Inventors: Kazuhiro Musha, Chigasaki (JP); Hirofumi Minami, Chigasaki (JP); Kiyotaka Yamada, Chigasaki (JP)

(73) Assignee: Ulvac, Inc., Kanagawa (JP)

( * ) Notice: Subject to any disclaimer, the term of this patent is extended or adjusted under 35 U.S.C. 154(b) by 81 days.

(21) Appl. No.: 13/129,889

(22) PCT Filed: Dec. 2, 2009

(86) PCT No.: PCT/JP2009/006538
§ 371 (c)(1),
(2), (4) Date: May 18, 2011

(87) PCT Pub. No.: WO2010/067540
PCT Pub. Date: Jun. 17, 2010

(65) Prior Publication Data
US 2011/0227294 A1    Sep. 22, 2011

(30) Foreign Application Priority Data

Dec. 10, 2008  (JP) ................................ 2008-314509

(51) Int. Cl.
*F16J 15/32*    (2006.01)
(52) U.S. Cl.
CPC .................................... *F16J 15/324* (2013.01)
USPC ..................................................... 277/572
(58) Field of Classification Search
USPC .................. 277/572, 549, 559, 500
See application file for complete search history.

(56) References Cited

U.S. PATENT DOCUMENTS 2,081,040 A * 5/1937 King ............................... 92/244
2,434,485 A * 1/1948 Chambers, Jr. ............... 277/555

(Continued)

FOREIGN PATENT DOCUMENTS

EP   0292037 A1   11/1988
EP   0919749 A1   6/1999

(Continued)

OTHER PUBLICATIONS

Office Action in the corresponding Chinese Application No. 200980149584.6, issued Mar. 24, 2014, 5 pages.

*Primary Examiner* — Kristina Fulton
*Assistant Examiner* — Eugene G Byrd
(74) *Attorney, Agent, or Firm* — Harness, Dickey & Pierce, PLC (57) ABSTRACT

[Object] To provide a seal mechanism that reduces a maintenance frequency for replenishment of a lubricating material and has small friction resistance, and a treatment apparatus equipped with the seal mechanism.
[Solving Means] A lip seal (12) of a seal mechanism (100) is arranged so as to surround a drive shaft (25), and a lip portion (12b) thereof includes a seal portion (12c) that comes into contact with the drive shaft (25). A wall member (15) is attached to the drive shaft (25) so as to close a lower opening of a mounting member (30) and face the lip seal (12). By at least the mounting member (30) and the wall member (15), a container capable of accommodating a lubricating material (16) is formed. A gap (17) set such that the lubricating material (16) does not pass therethrough is provided between the wall member (15) and a holding base body (60). With such a structure, a space for accommodating the lubricating material (16) can be secured and the seal mechanism (100) and the drive shaft (25) are allowed to be in contact with each other only at the seal portion (12c) of the lip seal (12).

10 Claims, 7 Drawing Sheets

(56) References Cited

U.S. PATENT DOCUMENTS

| | | | |
|---|---|---|---|
| 2,507,895 A * | 5/1950 | Foxtow | 277/549 |
| 3,746,128 A * | 7/1973 | Wunsch | 184/6.11 |
| 4,186,929 A * | 2/1980 | Burton et al. | 277/346 |
| 4,344,631 A | 8/1982 | Winn | |
| 5,165,699 A * | 11/1992 | Shrontz et al. | 277/301 |
| 5,169,126 A | 12/1992 | Reeve et al. | |
| 5,213,343 A * | 5/1993 | White, Jr. | 277/572 |
| 5,219,434 A * | 6/1993 | Von Bergen et al. | 277/351 |
| 5,348,313 A * | 9/1994 | Pawlakowitsch | 277/409 |
| 5,385,351 A * | 1/1995 | White | 277/572 |
| 5,501,893 A | 3/1996 | Laermer et al. | |
| 5,836,753 A * | 11/1998 | Takei et al. | 418/95 |
| 6,161,838 A * | 12/2000 | Balsells | 277/511 |
| 6,736,403 B2 * | 5/2004 | Kreutzer | 277/551 |
| 6,746,018 B2 * | 6/2004 | Lewis et al. | 277/349 |
| 7,513,690 B2 * | 4/2009 | Yamamoto et al. | 384/147 |
| 7,775,528 B2 * | 8/2010 | Berdichevsky | 277/559 |
| 7,823,886 B2 * | 11/2010 | Warnecke et al. | 277/551 |
| 7,914,209 B2 | 3/2011 | Yamamoto et al. | 384/147 |
| 7,946,592 B2 * | 5/2011 | Yamamoto et al. | 277/572 |
| 2003/0173746 A1 * | 9/2003 | Ramsay | 277/549 |
| 2006/0022414 A1 * | 2/2006 | Balsells | 277/572 |
| 2006/0279046 A1 * | 12/2006 | Vogt et al. | 277/549 |
| 2012/0112419 A1 * | 5/2012 | Franz | 277/572 |

FOREIGN PATENT DOCUMENTS

| | | |
|---|---|---|
| JP | 58-31424 | 3/1983 |
| JP | 56125548 | 3/1983 |
| JP | 59-52275 | 4/1984 |
| JP | 57148389 | 4/1984 |
| JP | 07328979 | 12/1995 |
| JP | 09207039 | 8/1997 |
| JP | 10184931 | 7/1998 |
| JP | 11326857 | 11/1999 |
| JP | 2001133745 | 5/2001 |
| JP | 2001271163 | 10/2001 |
| JP | 2003127988 | 5/2003 |
| JP | 2004154909 | 6/2004 |
| JP | 2005255701 | 9/2005 |
| JP | 2006100485 | 4/2006 |
| JP | 3819797 B | 6/2006 |
| JP | 2006281424 | 10/2006 |
| JP | 2007258573 | 10/2007 |
| WO | 9523988 A1 | 9/1995 |
| WO | 2006003962 | 1/2006 |

* cited by examiner

SEAL MECHANISM AND TREATMENT APPARATUS

TECHNICAL FIELD

The present invention relates to a seal mechanism to seal spaces filled with different gases or atmospheres under different pressures, and a treatment apparatus equipped with the seal mechanism.

BACKGROUND ART

From the past, an O-ring, a paste material, oil with high viscosity, or the like has been used as a mechanism to seal a gap between an atmospheric pressure side and a vacuum side, for example. Particularly, in a seal method for a rotation introducing mechanism to introduce a rotation drive force from an atmospheric pressure side to a vacuum side, a lubricating material such as a grease (with low viscosity) or lubricating oil that also functions to reduce friction at a friction/sliding portion may be used as a seal material. As the lubricating material as described above, a magnetorheological fluid may be used (see, for example, Patent Document 1, paragraph [0032] of the specification).

Since the lubricating material as described above is expendable, maintenance such as replenishment of a lubricating material is required, for example. Particularly, in the rotation introducing mechanism described above, a lubricating material is leaked to the vacuum side little by little, so the replenishment of the lubricating material is required.

Patent Document 1: Japanese Patent Application Laid-open No. 2007-258573

DISCLOSURE OF THE INVENTION

Problem to be Solved by the Invention

In the seal apparatus of Patent Document 1 described above, since a space for holding the magnetorheological fluid, that is, the volumetric capacity to accommodate the magnetorheological fluid is small, when even a small amount of the magnetorheological fluid is reduced, sealing performance is deteriorated. Therefore, a maintenance frequency is increased, which is disadvantageous. Further, since many magnetic poles for holding the magnetorheological fluid are provided, that is, many seal portions are provided, there arises a problem that slide resistance of a rotary shaft becomes large.

As in the case of a Wilson seal or the like, there is a seal mechanism including an accommodation space of a certain capacity for a lubricating material. However, the Wilson seal includes at least two portions for sealing by line contact, and therefore friction resistance between the rotary shaft and a fixing portion therearound is large.

In view of the circumstances as described above, it is an object of the present invention to provide a seal mechanism that reduces a maintenance frequency for replenishment of a lubricating material and has small friction resistance, and a treatment apparatus equipped with the seal mechanism.

Means for Solving the Problem

In order to achieve the above-mentioned object, according to an embodiment of the present invention, there is provided a seal mechanism including a seal member, a holding base body, and a wall member.

The seal member is arranged at a circumference of a rotary shaft.

The holding base body is arranged at the circumference of the rotary shaft and is capable of holding the seal member to be brought into contact with the rotary shaft.

The wall member is attached to the rotary shaft to form a container capable of accommodating a lubricating material together with at least the rotary shaft and the holding base body.

In the seal mechanism according to the embodiment of the present invention, the wall member may be provided to have a gap set such that the lubricating material does not pass therethrough between the wall member and the rotary shaft and attached to the holding base body to form a container capable of accommodating the lubricating material together with at least the rotary shaft, the holding base body, and the wall member.

According to an embodiment of the present invention, there is provided a treatment apparatus including a drive shaft, a seal member, a holding base body, and a wall member.

The seal member is arranged at a circumference of the drive shaft.

The holding base body is arranged at the circumference of the drive shaft and is capable of holding the seal member to be brought into contact with the drive shaft.

The wall member forms a container capable of accommodating a lubricating material together with at least the drive shaft and the holding base body.

BEST MODE FOR CARRYING OUT THE INVENTION

According to an embodiment of the present invention, there is provided a seal mechanism including a seal member, a holding base body, and a wall member.

The seal member is arranged at a circumference of a rotary shaft.

The holding base body is arranged at the circumference of the rotary shaft and is capable of holding the seal member to be brought into contact with the rotary shaft.

The wall member is a wall member provided to have a gap set such that the lubricating material does not pass therethrough between the wall member and the holding base body and attached to the rotary shaft to form a container capable of accommodating the lubricating material together with at least the holding base body and the wall member.

The lubricating material can be accommodated in a container formed by the wall member and the holding base body, and a gap through which the lubricating material does not pass is formed between the wall member and the holding base body. Therefore, a space for accommodating the lubricating material can be secured and the seal mechanism and the rotary shaft are allowed to be in contact with each other only at a linear seal member of the seal member, which faces the circumference of the rotary shaft. As a result, a maintenance frequency for replenishment of the lubricating material can be reduced and friction resistance between the seal mechanism and the rotary shaft can be reduced.

The "holding base body" may include both concepts of a circumferential wall and a mounting member to mount a seal member on the circumferential wall, which will be described later, or may include one of the concepts of the circumferential wall and the mounting member.

The container may be formed by the holding base body, the wall member, and the seal member. Accordingly, the volumetric capacity of a space for accommodating a lubricating material can be made large.

The holding base body may include a circumferential wall having an inner circumferential surface, and a mounting member to mount the seal member on the inner circumferential surface of the circumferential wall. In this case, the gap may be provided between the wall member and the inner circumferential surface of the circumferential wall or between the wall member and the mounting member. Alternatively, the gap may be provided between the wall member and the inner circumferential surface of the circumferential wall and between the wall member and the mounting member.

The wall member may be arranged to face the seal member. In this case, in the seal mechanism, the rotary shaft is arranged along a vertical direction, and in the case where the rotary shaft is rotatable, the seal mechanism may further include a pumping mechanism to pump the lubricating material from the wall member side to the seal member side by using a force generated by rotation of the rotary shaft. Accordingly, the lubricating material accommodated in the container easily reaches the seal member, and the life expansion of the seal member can be achieved.

The pumping mechanism may include a spiral flow path provided at the circumference of the rotary shaft. In other words, the lubricating material is pumped through the spiral flow path by the rotation of the rotary shaft. Alternatively, the pumping mechanism may include a cup-shaped guide member formed to be gradually widened toward the seal member side from the wall member side.

According to an embodiment of the present invention, there is provided a seal mechanism including a seal member, a holding base body, and a wall member.

The seal member includes a seal member and is arranged at a circumference of a rotary shaft.

The holding base body is arranged at the circumference of the rotary shaft and is capable of holding the seal member to be brought into contact with the rotary shaft.

The wall member is provided to have a gap set such that the lubricating material does not pass therethrough between the wall member and the rotary shaft and attached to the holding base body to form a container capable of accommodating the lubricating material together with at least the rotary shaft and the holding base body.

Hereinafter, embodiments of the present invention will be described with reference to the drawings.

Figure 1:
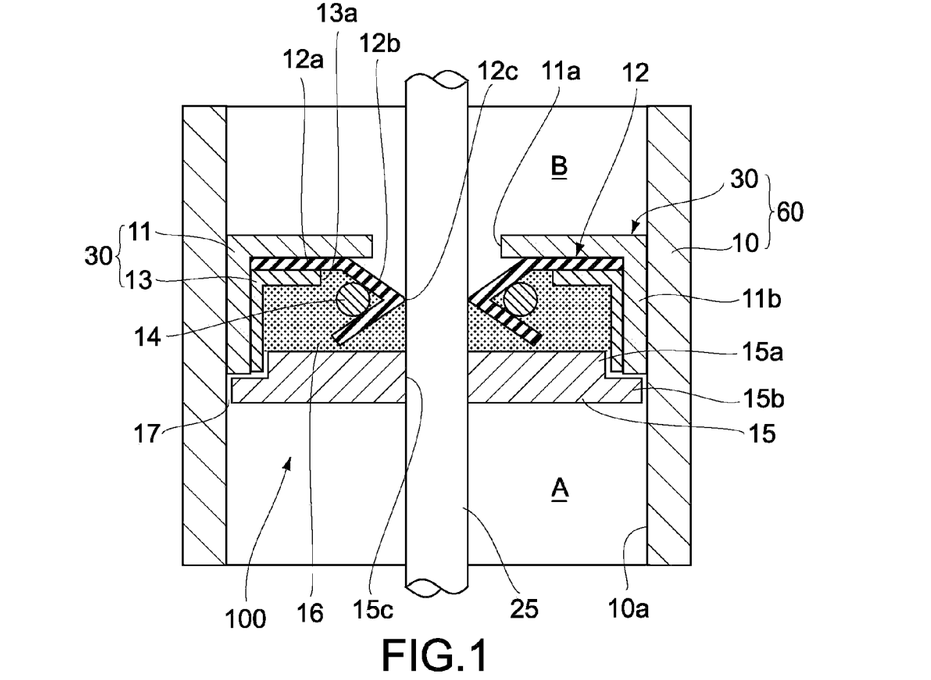
[FIG. 1] A cross-sectional view showing a seal mechanism according to an embodiment of the present invention.

FIG. 1 is a cross-sectional view showing a seal mechanism according to an embodiment of the present invention.

The seal mechanism 100 has a function of hermetically sealing an atmospheric pressure side A and a vacuum side B in a rotation introducing mechanism for transmitting a rotation movement generated by a motor or the like (not shown), for example, from the atmospheric pressure side A in a lower portion of FIG. 1 to the vacuum side B in an upper potion thereof via a rotary shaft 25.

The seal mechanism 100 includes a lip seal 12, a holding base body 60, and a wall member 15.

As a seal member, for example, the lip seal 12 is arranged so as to surround the rotary shaft 25. The lip seal 12 includes a disc-shaped upper plate portion 12a and a lip portion 12b formed so as to be extended obliquely downward from the upper plate portion 12a toward an inner circumferential side of the rotation of the rotary shaft 25 and folded back at the rotary shaft 25. The lip portion 12b includes a seal portion 12c brought into contact with the rotary shaft 25. The lip seal 12 is formed into a shape in which a contact area with rotary shaft 25 at the seal portion 12c becomes small, but the shape thereof is not particularly limited. Particularly, the lip portion 12b is formed such that a contact portion between the seal portion 12c and the rotary shaft 25 has a linear shape (circular shape when seen on the plane perpendicular to the rotary shaft 25).

The shape of the upper plate portion 12a is not limited to be a disc shape, that is, a circular shape when seen on the plane perpendicular to the rotary shaft 25, and it may be a polygon, an ellipse, or a shape of combination thereof. Alternatively, the shape of the upper plate portion 12a may not be formed continuously in a circumferential direction of the rotation of the rotary shaft 25, or may be formed intermittently.

As a material of the lip seal 12, for example, natural rubber, synthetic rubber, elastomer such as elastic plastic, or the like is used.

On an outer circumferential side of the lip portion 12b of the lip seal 12, a ring-shaped or coil-shaped presser member 14 is provided. The presser member 14 is for pressing the seal portion 12c to the rotary shaft 25 and assisting a sealing action.

The holding base body 60 is constituted of a housing 10 to serve as a circumferential wall and a mounting member 30 that is provided at the circumference of the rotary shaft 25 and mounts the lip seal 12 on an inner circumferential surface 10a of the housing 10.

The mounting member 30 holds the seal portion 12c of the lip seal 12 so as to be brought into contact with the rotary shaft 25. The phrase "so as to be brought into contact" may include a state where, from a microscopic standpoint, in the case where a lubricating material 16 is supplied to this seal mechanism 100, a film by the lubricating material 16 is formed between the rotary shaft 25 and the seal portion 12c.

For example, the mounting member 30 is constituted of two members 11 and 13 each having a container shape and provided with holes 11a and 13a at the center thereof, respectively, through which the rotary shaft 25 passes. Those container-shaped members 11 and 13 holds the lip seal 12 such that the upper plate portion 12a of the lip seal 12 is sandwiched therebetween. A perpendicular portion 11b of the container-shaped member 11 of the mounting member 30 is mounted on the inner circumferential surface 10a of the housing 10 such that the hermeticity between the atmospheric pressure side A and the vacuum side B can be maintained. The hermeticity between the perpendicular portion 11b and the inner circumferential surface 10a of the housing 10 may be secured by an O-ring (not shown) or the like, or the perpendicular portion 11b and the inner circumferential surface 10b may be bonded by a bonding method capable of maintaining the hermeticity, such as welding or adhesion.

As a material of the mounting member 30, for example, metal, plastic, rubber, or the like is used, but any material may be used as long as the material can hold the lip seal 12 and maintain the hermeticity with the housing 10.

The wall member 15 is attached to the rotary shaft 25 so as to close a lower opening of the mounting member 30 and face the lip seal 12. At the center of the wall member 15, a through-hole 15c is provided, through which the rotary shaft 25 is inserted and fixed. The rotary shaft 25, the mounting member 30, the wall member 15, and the lip seal 12 form a container capable of accommodating the lubricating material 16. The lubricating material 16 has a function of reducing friction due to slide between the seal portion 12c of the lip seal 12 and the rotary shaft 25.

It should be noted that in FIG. 1, the container substantially fills up with the lubricating material 16, but the container may accommodate the lubricating material 16 in an amount at which the container is filled up to at least the height of the seal portion 12c, for example.

The rotary shaft 25 is connected to an inner circumferential surface of the through-hole 15c of the wall member 15. As a connection means therefore, for example, an O-ring (not shown), welding, adhesion, or the like may be used. Even in the case where an O-ring is used, the wall member 15 and the rotary shaft 25 only have to be connected such that in a rotation operation of the rotary shaft 25, the rotary shaft 25 and the wall member 15 are integrally moved as much as possible with a predetermined rigidity. Therefore, in the case where a rotation speed of the rotary shaft 25 is high, both the members may be connected not by an O-ring but by welding, adhesion, or the like. However, both the members are not necessarily required to be moved integrally.

A gap 17 set such that the lubricating material 16 does not pass therethrough is provided between the wall member 15 and the holding base body 60. In other words, the size of the gap 17 is set such that the lubricating material 16 does not pass through the gap 17. For example, the wall member 15 is constituted of a small diameter portion 15a and a large diameter portion 15b provided under the small diameter portion 15a. An outer circumferential surface of the small diameter portion 15a is opposed to a lower end portion of the mounting member 30, and an outer circumferential surface of the large diameter portion 15b is opposed to the inner circumferential surface 10a of the housing 10, and accordingly the gap 17 is formed.

The gap 17 may be set as appropriate such that the lubricating material 16 does not leak in accordance with a type of lubricating material 16 (temperature-viscosity characteristics or the like), temperature around the seal mechanism 100, or the like. The gap 17 is typically set to 1 mm to several mm. As the lubricating material 16, a general one obtained by adding a material for enhancing viscosity such as a thickening agent to lubricating oil may be used. However, to prevent contamination of the vacuum side, a lubricating material for vacuum (for example, YVAC1 manufactured by Solvay Solexis) can be used.

As described above, in the seal mechanism 100 according to this embodiment, the lubricating material 16 can be accommodated in the container formed by at least the rotary shaft 25, the wall member 15, and the holding base body 60, and the gap 17 through which the lubricating material 16 does not pass is formed between the wall member 15 and the holding base body 60. Therefore, it is possible to secure a space for accommodating the lubricating material 16 and allows the seal mechanism 100 and the rotary shaft 25 to be in contact with each other only at the seal portion 12c of the lip seal 12. As a result, it is possible to reduce a maintenance frequency for replenishment of the lubricating material 16 and make slide resistance between the seal mechanism 100 and the rotary shaft 25 small. Since the friction resistance is small as described above, a load on the drive source for rotating the rotary shaft 25 can be made small (drive source can be downsized). A temperature rise due to heat caused by the slide is also small. Further, wear of the seal portion 12c becomes less and generation of particles and deterioration of a seal can be suppressed, with the result that the life expansion of the seal mechanism 100 can be achieved.

Particularly, since the rotary shaft 25, the mounting member 30, the wall member 15, and the lip seal 12 form the container of the lubricating material 16, the volumetric capacity of a space for accommodating the lubricating material 16 can be made large.

Figure 2:
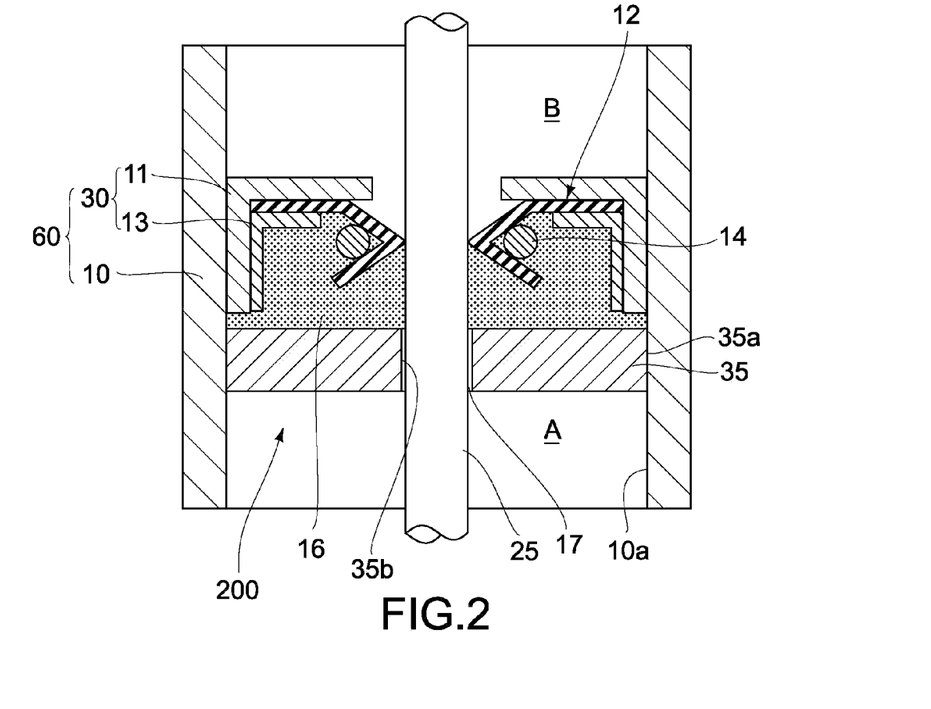
[FIG. 2] A view showing a seal mechanism according to another embodiment of the present invention.

FIG. 2 is a view showing a seal mechanism according to another embodiment of the present invention. In the following description, the same members, functions, and the like as those included in the seal mechanism 100 according to the embodiment shown in FIG. 1 or the like will be simply described or description thereof will be omitted, and different points will be mainly described.

In the seal mechanism 100 shown in FIG. 1, the wall member 15 is connected to the rotary shaft 25. In a seal mechanism 200 shown in FIG. 2, a wall member 35 is connected to the holding base body 60. Typically, an outer circumferential surface of the wall member 35 is connected to the inner circumferential surface 10a of the housing 10. As a connection means therefore, for example, an O-ring, welding, adhesion, or the like may be used as described above. Further, a through-hole 35b through which the rotary shaft 25 passes is provided at the center of the wall member 35. Between an inner circumferential surface of the through-hole 35b and an outer circumferential surface of the rotary shaft 25, the gap 17 that is set such that the lubricating material 16 does not pass therethrough is provided. The wall member 35, the holding base body 60, and the lip seal 12 form a container of the lubricating material 16.

With such a seal mechanism 200, the same effect as that of the seal mechanism 100 is also obtained.

Figure 3:
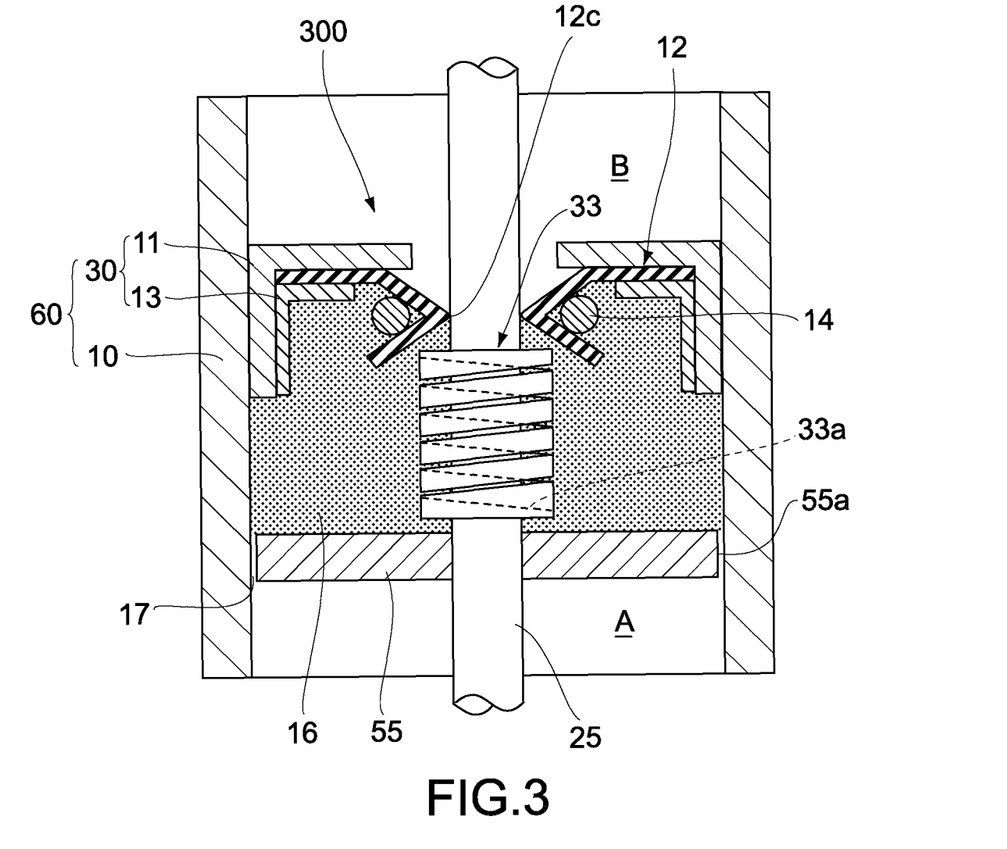
[FIG. 3] A cross-sectional view showing a seal mechanism including a pumping mechanism according to still another embodiment of the present invention.

FIG. 3 is a cross-sectional view showing a seal mechanism according to still another embodiment of the present invention.

To the rotary shaft 25 of this seal mechanism 300, an attachment 33 including a spiral flow path 33a is attached. The attachment 33 is provided between a wall member 55 arranged so as to face the lip seal 12 and the lip seal 12. The shape of a surface of the flow path 33a is not limited to such a curved surface, and may be a flat surface or a combination of a flat surface and a curved surface. Further, in FIG. 3, the wall member 55 is connected to the rotary shaft 25, but the wall member 55 may be connected to the holding base body 60 as shown in FIG. 2.

Figure 4:
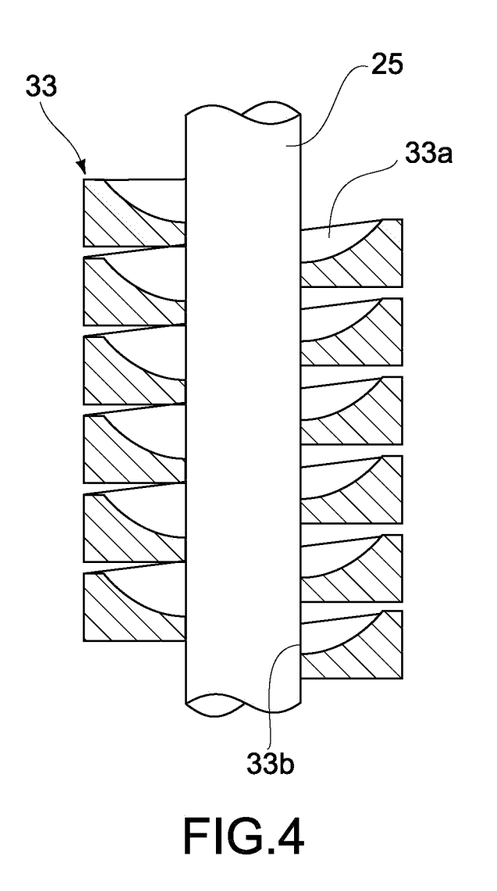
[FIG. 4] A cross-sectional view showing an attachment of the seal mechanism of FIG. 3.

FIG. 4 is a cross-sectional view showing the attachment 33. The attachment 33 includes a hole 33b at the center thereof, into which the rotary shaft 25 is inserted to be fixed. The attachment 33 is attached to the rotary shaft 25 such that the spiral flow path 33a is arranged about the rotary shaft 25.

Between an outer circumferential surface 55a of the wall member 55 and the housing 10 of the holding base body 60, the gap 17 that is set such that the lubricating material 16 does not pass therethrough is provided.

By the rotation of the rotary shaft 25, the attachment 33 is rotated in a predetermined direction. Accordingly, the lubricating material 16 is agitated by the attachment 33 and pumped along the spiral flow path 33a from the wall member 15 side to the lip seal 12 side (pumping mechanism). In this case, a combination of a direction of the flow path of the attachment 33 and a rotation direction of the rotary shaft 25, by which the lubricating material 16 is pumped, may be set as appropriate. In the case of causing shaking or the like, a ratchet mechanism may be added.

According to such a pumping mechanism, the lubricating material 16 accommodated in the container formed by at least the holding base body 60 and the wall member 55 easily reaches the seal portion 12c, and the life expansion of the seal portion 12c can be achieved.

In the embodiment shown in FIG. 4, the attachment 33 may not be provided and the rotary shaft 25 may have a spiral groove constituting a flow path of the lubricating material 16.

Figure 5:
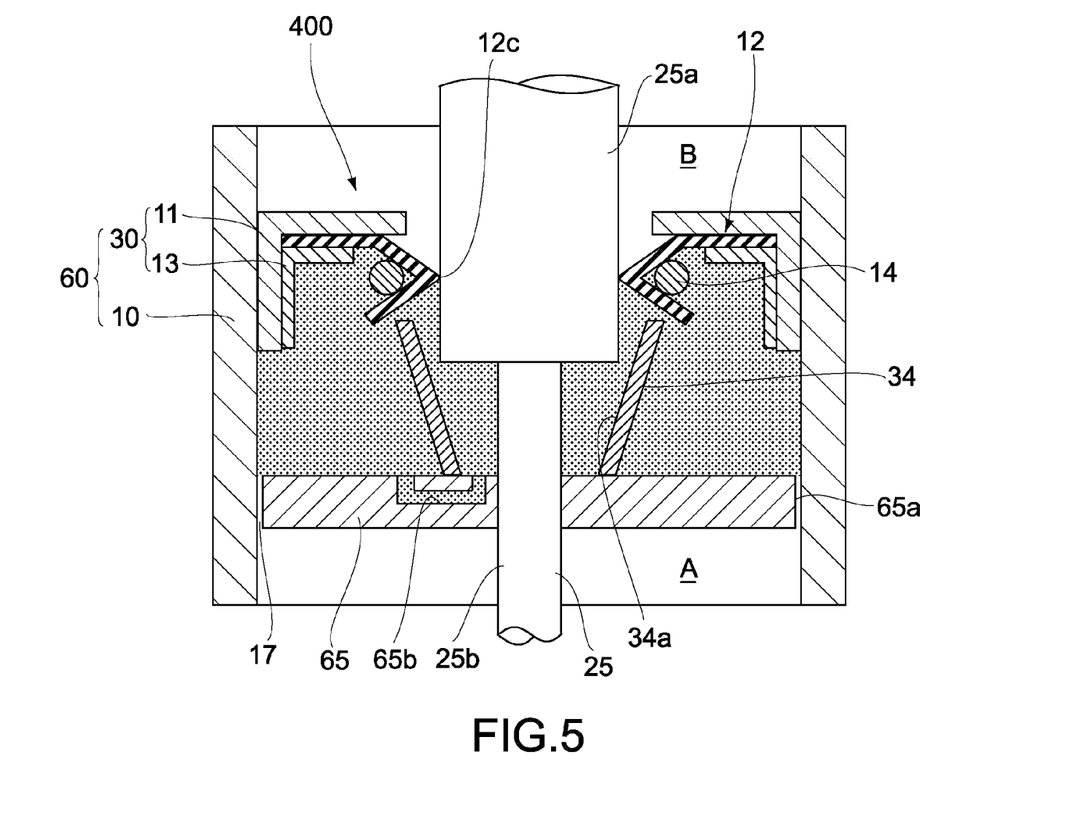
[FIG. 5] A cross-sectional view showing a seal mechanism according to still another embodiment of the present invention, showing another embodiment of the pumping mechanism.

FIG. 5 is a cross-sectional view showing a seal mechanism according to still another embodiment of the present invention, showing another embodiment of the pumping mechanism.

A pumping mechanism provided to a seal mechanism 400 includes a cup-shaped guide member (vane) 34 that is formed to be gradually widened toward the lip seal 12 side from a wall member 65 side. A lower end portion of the guide member 34 is connected and fixed to the wall member 65 and an upper end portion thereof is opened.

The cup shape refers to a shape whose side circumferential surface is typically constituted of a part of a conical surface. However, the shape may be constituted of a pyramid, not a circular cone. In the cross section shown in FIG. 5, the inclination of an inner circumferential surface 34a of the guide member 34 is linear, but it may be curved or a combination of a straight line and a curve.

The wall member 65 is provided with a communication path 65b that communicate between the inside of the guide member 34 (rotary shaft 25 side) and the outside thereof. Accordingly, for example, even when a liquid level of the lubricating material 16 is lowered below the upper end portion of the guide member 34, the lubricating material 16 can be caused to flow between the inside and outside of the guide member 34. One or more communication paths 65b as described above may be provided.

It should be noted that the rotary shaft 25 includes a small diameter portion 25b provided on the wall member 65 side and a large diameter portion 25a provided on the lip seal 12 side, and the lip seal 12 is arranged around the large diameter portion 25a. However, the rotary shaft 25 may be identical to that shown in FIGS. 1 to 3.

By the rotation of the rotary shaft 25, the wall member 65 attached to the rotary shaft 25 is rotated and the guide member 34 is rotated accordingly. At this time, the lubricating material 16 is rotated as if to be dragged by the guide member 34 due to the viscosity thereof. At this time, a centrifugal force is generated in the lubricating material 16 and accordingly the lubricating material 16 inside the guide member 34 is pumped to the lip seal 12 side along the inner circumferential surface 34a of the guide member 34.

Also by such a pumping mechanism, the lubricating material 16 accommodated in the container formed by at least the holding base body 60 and the wall member 65 easily reaches the seal portion 12c, and the life expansion of the seal portion 12c can be achieved.

Although the wall member 65 is connected to the rotary shaft 25 in FIG. 5, the wall member 65 may be connected to the holding base body 60 as shown in FIG. 2. In this embodiment, when the rotary shaft 25 is rotated, the lubricating material 16 is rotated as if to be dragged by the rotary shaft 25 due to the viscosity thereof. At this time, a centrifugal force is generated in the lubricating material 16 and accordingly the lubricating material 16 inside the guide member 34 is pumped to the lip seal 12 side along the inner circumferential surface 34a of the guide member 34.

Next, a treatment apparatus to which one of the seal mechanisms 100, 200, 300, and 400 described above is applied, for example, a transfer apparatus will be described.

Figure 6:
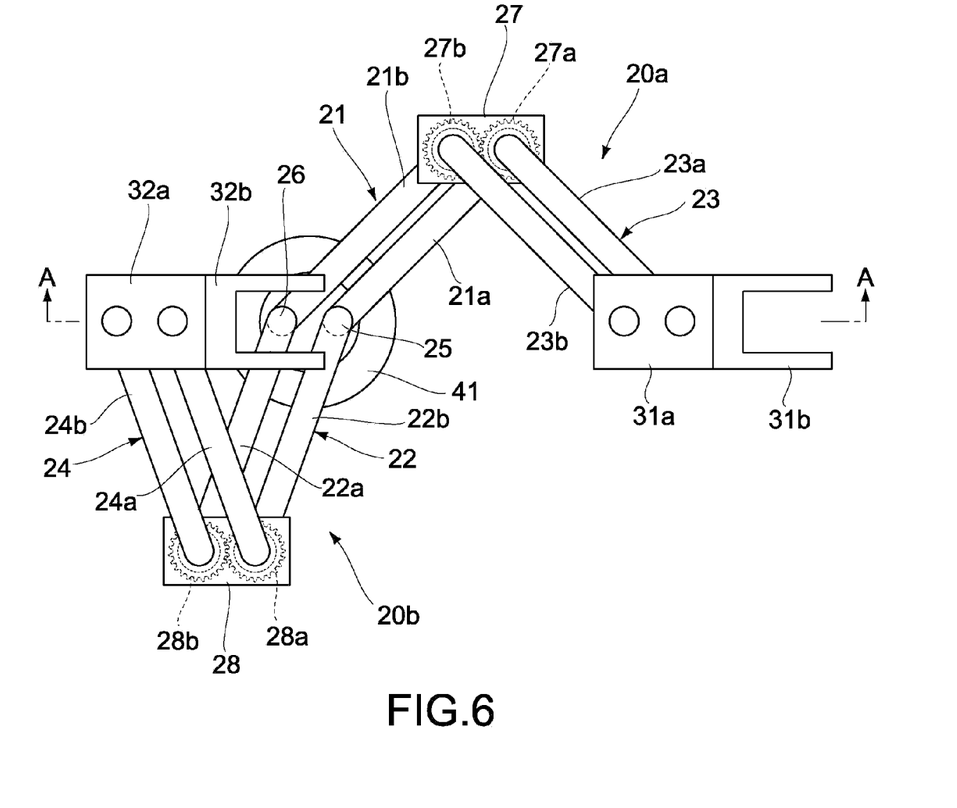
[FIG. 6] A plan view showing a transfer apparatus to which one of the seal mechanisms according to the embodiments is applied.
Figure 7:
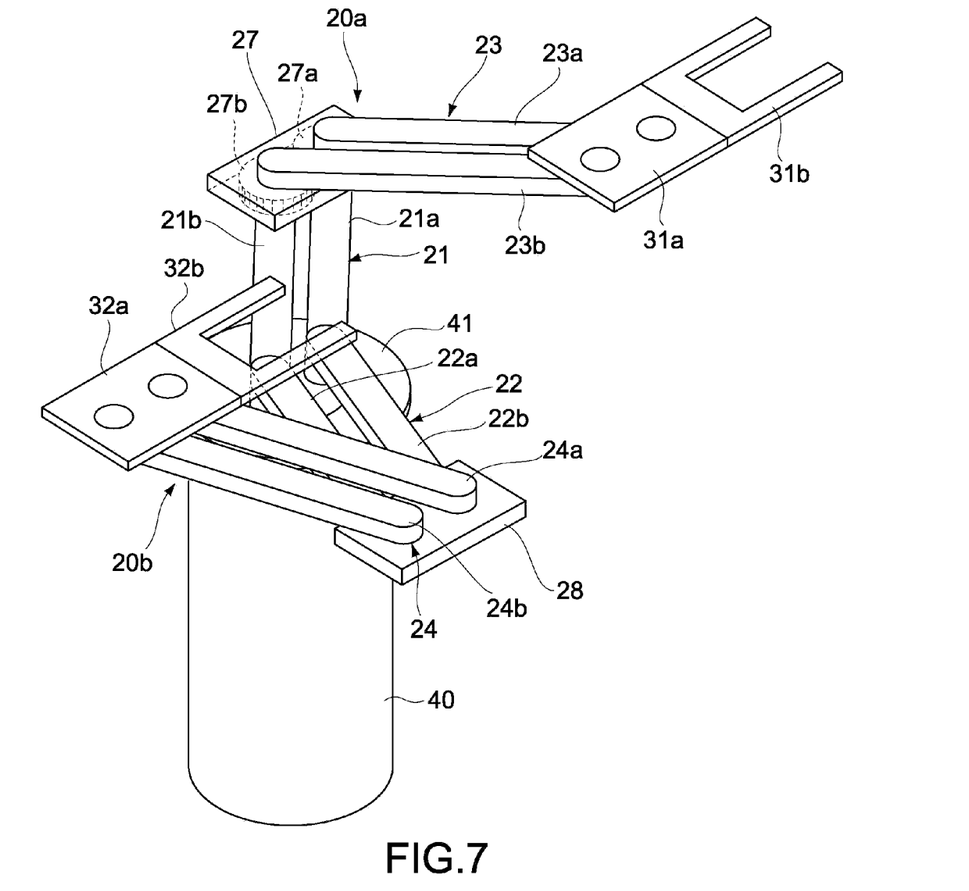
[FIG. 7] A perspective view showing the transfer apparatus shown in FIG. 6.

FIG. 6 is a plan view showing the transfer apparatus and FIG. 7 is a perspective view thereof.

As shown in FIGS. 6 and 7, a link mechanism in the transfer apparatus is constituted of a first link mechanism 20a and a second link mechanism 20b. The first link mechanism 20a is constituted of a first parallel link 21 and a third parallel link 23, and the second link mechanism 20b is constituted of a second parallel link 22 and a fourth parallel link 24.

The first parallel link 21 includes a first arm 21a and a fourth arm 21b, and the second parallel link 22 includes a second arm 22a and a third arm 22b. The third parallel link 23 includes a fifth arm 23a and a sixth arm 23b, and the fourth parallel link 24 includes a seventh arm 24a and an eighth arm 24b.

The first arm 21a is fixedly attached to a first drive shaft 25, and the second arm 22a is fixedly attached to a second drive shaft 26. The third arm 22b is rotatably attached to the first drive shaft 25, and the fourth arm 21b is rotatably attached to the second drive shaft 26. Therefore, those arm pairs of the first arm 21a and fourth arm 21b, and the second arm 22a and third arm 22b are structured to be rotated in the same direction. In this case, a fixedly attaching means or a rotatably attaching means is not particularly limited and a well-known means such as a key or a bearing may be used.

To an end of the first arm 21a, a gear 27a in a gearbox 27 is fixed, and an end of the fifth arm 23a is also coupled to the gear 27a so as to be turnable. To a gear 27b, an end of the sixth arm 23b is fixed and an end of the fourth arm 21b is also coupled so as to be turnable. To an end of the third arm 22b, a gear 28a in a gearbox 28 is fixed, and an end of the seventh arm 24a is also coupled to the gear 28a to as to be turnable. To a gear 28b, an end of the eighth arm 24b is fixed and an end of the second arm 22a is also coupled so as to be turnable. Those gears 27a, 27b, 28a, and 28b are structured such that rotations between parallel links to be connected, that is, between the first parallel link 21 and the third parallel link 23, and between the second parallel link 22 and the fourth parallel link 24, become opposite to each other. Those arm pairs such as the fifth arm 23a and sixth arm 23b, and the seventh arm 24a and eighth arm 24b are structured to be rotated in the same direction.

The first drive shaft 25 and the second drive shaft 26 are provided to pass through a shaft support base 41 serving as a flange portion of a casing 40 in which a drive source is arranged.

The attachment of the parallel links including the arms described above is performed as follows. First, when the first parallel link 21 is attached to the first drive shaft 25 and the second drive shaft 26, the first arm 21a of the first parallel link and the first drive shaft 25 are fixedly coupled by a key or the like, and the fourth arm 21b of the first parallel link 21 and the second drive shaft 26 are attached so as to be rotatable by a member enabling a rotation movement such as a bearing. When the second parallel link 22 is attached to the first drive shaft 25 and the second drive shaft 26, the second arm 22a of the second parallel link 22 and the second drive shaft 26 are fixedly coupled by a key or the like, and the third arm 22b of the second parallel link 22 and the first drive shaft 25 are attached so as to be rotatable by a member enabling a rotation movement such as a bearing.

As described above, the first parallel link 21 and the second parallel link 22 have two attachment shafts and share the shafts such that two arms are attached to one attachment shaft. As a result, it is possible to reduce the number of constituent members and reduce a total weight of the transfer apparatus and manufacturing costs thereof. Further, the two parallel links are attached by using only two shafts of the first drive shaft 25 and second drive shaft 26. Therefore, as compared to a case of a transfer apparatus in which four shafts in total including two drive shafts and two driven shafts are arranged at intervals and two parallel links are attached thereto as in a conventional technique, a turning radius is made small by that interval and a space-saving apparatus can be provided.

At a leading end of the third parallel link 23 and that of the fourth parallel link 24 described above, a first holding portion 31a and a second holding portion 32a are attached, respectively. At leading ends of the holding portions 31a and 32a, a first pickup 31b and a second pickup 32b for delivering a processed body such as a substrate are attached.

To downsize an actuator that performs a rotation movement, the structures therein may have to be arranged asymmetrically with respect to the center axis, but in such a configuration, a force is not applied uniformly to the internal structures at a time of evacuation. Therefore, there is a possibility that an uneven external force is applied to the inside of the actuator and distortion is caused in the internal structures depending on circumstances. As countermeasures of such distortion, generally, the rigidity of the structures is raised or a holding member is separately attached, but there arises a problem that the actuator is enlarged. In this regard, in this embodiment, to protect the internal structures of the actuator (internal structures of casing), a protective member attached to the outside of the actuator is given rigidity and many attachment contacts with the actuator side. Accordingly, it is possible to suppress deformation such as distortion of the actuator due to an uneven force applied to the actuator by evacuation or the like without enlarging the actuator. This protective member may be formed of a material having a large Young's modulus such as stainless steel or iron, or formed into a shape in which a second moment of area is increased.

Figure 8:
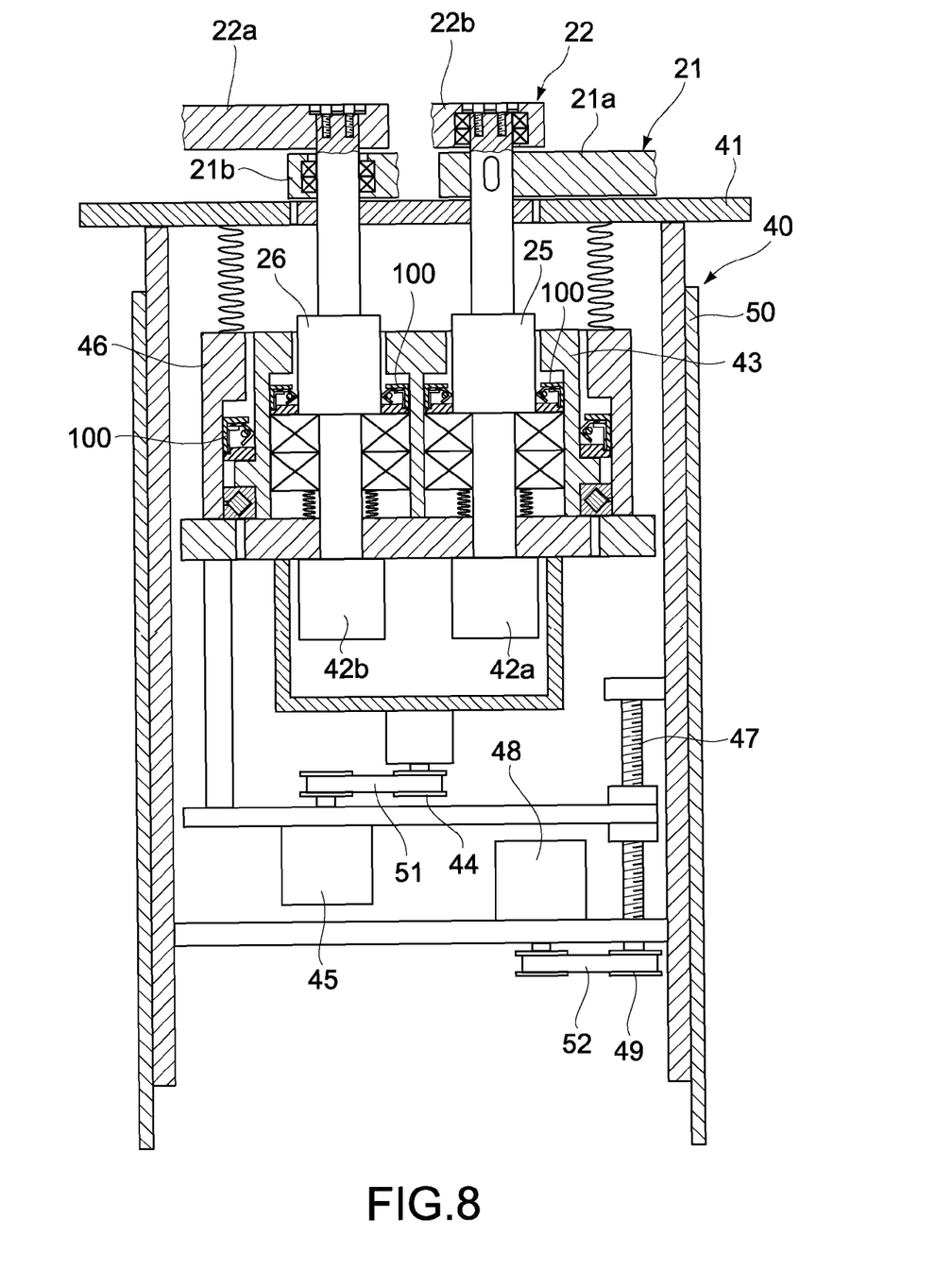
[FIG. 8] A cross-sectional view showing the whole structure of the transfer apparatus shown in FIG. 6.

Next, with reference to FIG. 8 showing the whole structure of the transfer apparatus to which the first drive shaft 25 and the second drive shaft 26 described above are attached (the whole of the first link mechanism 20a and second link mechanism 20b is not shown) and FIGS. 6 and 7 descried above, an operation of the transfer apparatus will be described. FIG. 8 is a cross-sectional view showing the whole structure of the transfer apparatus. In FIG. 8, constituent members that are the same as those of FIGS. 6 and 7 are denoted by the same reference symbols unless otherwise noted.

The first drive shaft 25 and the second drive shaft 26 are installed so as to pass through a flange portion (shaft support base) 41 of the casing 40. At a lower end of the first drive shaft 25 and that of the second drive shaft 26, a first drive source 42a and a second drive source 42b such as motors are provided, respectively, in the casing 40.

By the first drive source 42a and the second drive source 42b, the first drive shaft 25 and the second drive shaft 26 are respectively rotated and along with that rotation, the first parallel link 21 and the second parallel link 22 are rotated.

The first parallel link 21 and the second parallel link 22 are structured such that the rotation thereof gives a reverse rotation to the third parallel link 23 and the fourth parallel link 24 via the gears. Therefore, it becomes possible for the first holding portion 31a and the second holding portion 32a to be linearly moved back and forth on a straight line connecting the first drive shaft 25 and the second drive shaft 26.

As a result, the first pickup 31b and the second pickup 32b move linearly while holding a substrate therebetween to thereby transfer the substrate. In this case, the first link mechanism 20a and the second link mechanism 20b are arranged so as to be different in height with respect to a horizontal plane. Therefore, both the link mechanisms, that is, the first pickup 31b and the second pickup 32b can pass each other without collision.

In FIGS. 6 to 8, the example in which the first link mechanism 20a is positioned upward and the second link mechanism 20b is positioned downward is shown, but they may be arranged at reverse positions as a matter of course.

Around the first drive shaft 25 and the second drive shaft 26, for example, at least one seal mechanism 100 shown in FIG. 1 is provided to each drive shaft. Instead of the seal mechanism 100, any of the seal mechanisms 200, 300, and 400 may be provided. The casing 40 in which a drive source or the like is arranged is structured such that a vacuum state on a substrate transfer side including the first link mechanism 20a and the second link mechanism 20b is secured in the casing 40.

By operation of the first drive source 42a, the first parallel link 21 is rotated via the first drive shaft 25. The third parallel link 23 is attached to the first parallel link 21 via the gearbox 27. Since the third parallel link 23 is structured so as to operate in an opposite direction of the rotation of the first parallel link 21 by the same angle, the first holding portion 31a and the first pickup 31b can always face in a constant direction during expansion and contraction operations of the first link mechanism 20a. Accordingly, the first holding portion 31a and the first pickup 31b are moved back and forth on a straight line connecting the first drive shaft 25 and the second drive shaft 26.

Similarly, by operation of the second drive source 42b, the second parallel link 22 is rotated via the second drive shaft 26. The fourth parallel link 24 is attached to the second parallel link 22 via the gearbox 28. Since the fourth parallel link 24 is structured so as to operate in an opposite direction of the rotation of the second parallel link 22 by the same angle, the second holding portion 32a and the second pickup 32b can always face in a constant direction during expansion and contraction operations of the second link mechanism 20a. Accordingly, the second holding portion 32a and the second pickup 32b are moved back and forth on the straight line connecting the second drive shaft 26 and the first drive shaft 25.

In this case, a processed body such as a substrate is transferred by the first pickup 31b attached to the first holding portion 31a and the second pickup 32b attached to the second holding portion 32a. The link mechanisms including the first pickup and the second pickup are arranged upward and downward at an interval.

Further, the whole of the support base 43 including the first drive shaft 25 and the second drive shaft 26 is coupled to a third drive source 45 such as a motor via a first pulley 44 and a first belt 51. Therefore, by the operation of the third drive source 45, the first holding portion 31a and the second holding portion 32a respectively provided at leading ends of the third parallel link 23 and the fourth parallel link 24 respectively connected to the first parallel link 21 and the second parallel link 22 via the gears are turned in arbitrary directions.

Between the support base 43 and a support member 46, the seal mechanism 100 shown in FIG. 1 (seal mechanism 200, 300 or 400 may be possible as described above) is provided. The support base 43 or the support member 46 corresponds to the housing 10 of the holding base body 60 in FIGS. 1 to 5. Even when the above turning operation is performed, a vacuum state on the substrate transfer side can be maintained. Accordingly, in a vacuum treatment apparatus (not shown) equipped with the transfer apparatus, the number of treatment chambers, arrangement, or the like can be changed freely. The third drive source 45 may be directly connected to the support base 43.

Further, in the transfer apparatus according to this embodiment, a vertical movement mechanism that moves the first link mechanism 20a and the second link mechanism 20b in a vertical direction is provided. For example, as shown in FIG. 8, the support member 46 is coupled to a fourth drive source 48 serving as a motor, a second pulley 49, and a second belt 52 via a member having a ascent/descent function such as a ball screw 47, and accordingly by operating the fourth drive source 48, the support member 46 is ascended or descended. Accordingly, the first link mechanism 20a and the second link mechanism 20b, that is, the first holding portion 31a and the second holding portion 32a respectively provided at the leading ends of the third parallel link 23 and the fourth parallel link 24 respectively connected to the first parallel link 21 and the second parallel link 22 can be ascended or descended. Accordingly, in the vacuum treatment apparatus equipped with the transfer apparatus, the arrangement or the like can be freely changed. The fourth drive source 48 may be directly connected to the ball screw 47 or the like.

A stretchy member such as a bellows is provided between the support member 46 and the flange portion 41 of the casing 40 such that a hermetic state is maintained even when an ascent/descent movement is performed.

As shown in FIG. 8, to protect the structures inside the casing 40, a protective member 50 having a large Young's modulus that is formed of stainless steel, iron, or the like is attached to the outer circumference of the casing 40. Many attachment contacts between the protective member 50 and the casing 40 are provided. Accordingly, it is possible to suppress deformation such as distortion of the structures inside the casing 40 due to an uneven force applied to the actuator by evacuation or the like without enlarging the size of the casing 40.

According to the seal mechanism 100 or the like of this embodiment, a filling cycle of the lubricating material is long. Further, since slide resistance between the seal portion 12c of the lip seal 12 and the drive shaft 25 (or 26 etc.) is small, wear debris are less generated, which allows the surroundings to be kept clean. Further, the life-span is long and the improvement of a treatment efficiency of a processed body installed on the vacuum side can be expected. In addition, according to the transfer apparatus, since the attachment shafts of the first parallel link 21 and the second parallel link 22 are shared, it is possible to reduce the number of constituent members and reduce a total weight of the transfer apparatus and manufacturing costs thereof. Further, due to the sharing of the attachment shafts, a turning radius is made small and a space can be saved. Furthermore, when the turning radius is made small, a centrifugal force applied to the processed body (for example, silicon wafer) during a turning operation can be made small, which can raise a turning speed commensurately. Therefore, the charging and takeoff of the processed body to/from a predetermined position of a vacuum treatment chamber can be performed sequentially in one step efficiently. As a result, an operation time can be shortened, a treatment time of the processed body can be shortened, and foreign substances do not adhere to the processed body.

Therefore, the vacuum treatment apparatus equipped with such a transfer apparatus can be effectively used for treatment of deposition or the like in the field of semiconductor manufacturing apparatuses.

Embodiments of the present invention are not limited to the embodiments described above and other various embodiments are conceived.

The seal mechanisms 100, 200, 300, and 400 according to the embodiments described above each have been described as a mechanism to seal the atmospheric pressure side A and the vacuum side B. However, as the mechanism to seal spaces filled with different types of gases, those seal mechanisms may be used.

The lip seal 12 is not limited to have the shape shown in FIGS. 1 to 3 and 5 as described above, and the shape may be the shape of an O-ring or other shapes.

The drive shaft 25 is not limited to be used in a vertical direction, and a case where it is used horizontally or obliquely is also conceived. Alternatively, the seal mechanisms 100, 200, 300, and 400 each can also be applied to a treatment apparatus in which the drive shaft 25 is set horizontally or vertically, or the drive shaft 25 is movable.

As the treatment apparatus to which the seal mechanisms 100, 200, 300, and 400 are each applicable, the transfer apparatus has been exemplified in the above description. However, the treatment apparatus is not limited to the transfer apparatus, and any treatment apparatus may be used as long as it is a treatment apparatus in which the drive shaft 25 performs at least one of a rotation and a stroke. The transfer apparatus is not limited to one that transfers a substrate as described above, and may be a transfer apparatus that transfers other objects.

In addition to the transfer apparatus, examples of the treatment apparatus include an etching apparatus, a deposition apparatus, a resist application apparatus, an exposure apparatus, a developing apparatus, and other various apparatuses. Alternatively, though not limited to treatment apparatuses to treat a processed body such as a substrate, the seal mechanisms 100, 200, 300, and 400 each can also be applied to machines for work, construction, and civil engineering.

DESCRIPTION OF SYMBOLS

12 lip seal
12c seal portion
15,35,55,65 wall member
17 gap
25,26 drive shaft
30 mounting member
33a spiral flow path
33 attachment
34 guide member
60 holding base body
100,200,300,400 seal mechanism

The invention claimed is:

1. A seal mechanism comprising:
a seal member arranged at a circumference of a rotary shaft;
a holding base body that is arranged at the circumference of the rotary shaft and is capable of holding the seal member to be brought into contact with the rotary shaft;
a wall member to form a container together with the rotary shaft, the seal member and the holding base body;
a lubricating material disposed within the container; and
a cup-shaped guide member fixed to the wall member, the guide member formed to be gradually widened toward the seal member from the wall member,
the wall member being attached to the rotary shaft to have a gap set such that the lubricating material does not pass therethrough between the wall member and the holding base body, the wall member including a communication path that communicates between a circumferentially inner side of the guide member and a circumferentially outer side of the guide member, wherein the seal member and the wall member seal the container between an atmospheric pressure and a vacuum, the lubricating material sealing the gap between the wall member and the holding base body.

2. The seal mechanism according to claim 1, wherein the holding base body includes a circumferential wall having an inner circumferential surface, and a mounting member to mount the seal member on the inner circumferential surface of the circumferential wall.

3. The seal mechanism according to claim 1, wherein the wall member is arranged below the seal member so as to face the seal member, and the rotary shaft is arranged along a vertical direction, the seal mechanism further comprising a pumping mechanism provided between the seal member and the wall member to pump the lubricating material to the seal member by using a force generated by rotation of the rotary shaft.

4. The seal mechanism according to claim 3, wherein the pumping mechanism includes a spiral flow path provided at the circumference of the rotary shaft.

5. A seal mechanism comprising:

a seal member arranged at a circumference of a rotary shaft;

a holding base body that is arranged at the circumference of the rotary shaft and is capable of holding the seal member to be brought into contact with the rotary shaft;

a wall member to form a container together with the rotary shaft, the seal member and the holding base body;

a lubricating material disposed within the container; and a cup-shaped guide member fixed to the wall member, the guide member formed to be gradually widened toward the seal member from the wall member, the wall member being attached to the holding base body to have a gap set such that the lubricating material does not pass therethrough between the wall member and the rotary shaft, the wall member including a communication path that communicates between a circumferentially inner side of the guide member and a circumferentially outer side of the guide member, wherein the seal member and the wall member seal the container between an atmospheric pressure and a vacuum, the lubricating material sealing the gap between the wall member and the rotary shaft.

6. The seal mechanism according to claim 5, wherein the wall member is arranged below the seal member so as to face the seal member, and the rotary shaft is arranged along a vertical direction, the seal mechanism further comprising a pumping mechanism provided between the seal member and the wall member to pump the lubricating material to the seal member by using a force generated by rotation of the rotary shaft.

7. The seal mechanism according to claim 6, wherein the pumping mechanism includes a spiral flow path provided at the circumference of the rotary shaft.

8. A treatment apparatus equipped with the seal mechanism according to claim 1 or 5.

9. The seal mechanism according to claim 1, wherein the communication path includes a first opening disposed on the circumferentially inner side of the guide member and a second opening disposed on the circumferentially outer side of the guide member.

10. The seal mechanism according to claim 5, wherein the communication path includes a first opening disposed on the circumferentially inner side of the guide member and a second opening disposed on the circumferentially outer side of the guide member.

* * * * *